United States Patent [19]
Yang et al.

[11] Patent Number: 5,717,717
[45] Date of Patent: Feb. 10, 1998

[54] DEVICE AND METHOD FOR ADAPTIVE NARROW BAND INTERFERENCE SUPPRESSION IN MULTIPLE-ACCESS COMMUNICATIONS

[75] Inventors: Jian Yang, Mansfied; M. Vedat Eyuboglu, Concord, both of Mass.

[73] Assignee: Motorola, Inc., Schaumburg, Ill.

[21] Appl. No.: 526,519

[22] Filed: Sep. 11, 1995

[51] Int. Cl.⁶ .................................................. H03H 7/30
[52] U.S. Cl. ...................... 375/232; 375/233; 375/235; 375/341; 375/349; 375/350; 370/320; 370/335; 370/342; 455/52.3; 455/65
[58] Field of Search ................... 375/205, 229–235, 375/341, 346–350; 370/123, 93, 69.1, 18, 320, 335, 342; 364/724.01, 724.16, 724.19, 724.2; 455/50.1, 52.1, 63, 65

[56] References Cited

U.S. PATENT DOCUMENTS

| | | | |
|---|---|---|---|
| 5,164,962 | 11/1992 | Nakai et al. | 375/221 |
| 5,285,480 | 2/1994 | Chennakeshu et al. | 375/349 |
| 5,377,226 | 12/1994 | Davis | 375/200 |
| 5,414,699 | 5/1995 | Lee | 370/18 |
| 5,537,443 | 7/1996 | Yoshino et al. | 375/346 |

Primary Examiner—Stephen Chin
Assistant Examiner—Amanda T. Le
Attorney, Agent, or Firm—Darleen J. Stockley; Peter M. Dichiara

[57] ABSTRACT

The present invention provides a device and method in multi-access communications system for reliably receiving burst transmissions from users in the presence of narrow band interference. The adaptive interference suppresser incorporates adaptive elements that are updated using a predetermined adaptation algorithm. These adaptive elements are stored in memory at the end of the burst transmission for reuse in receiving a next burst transmission.

25 Claims, 4 Drawing Sheets

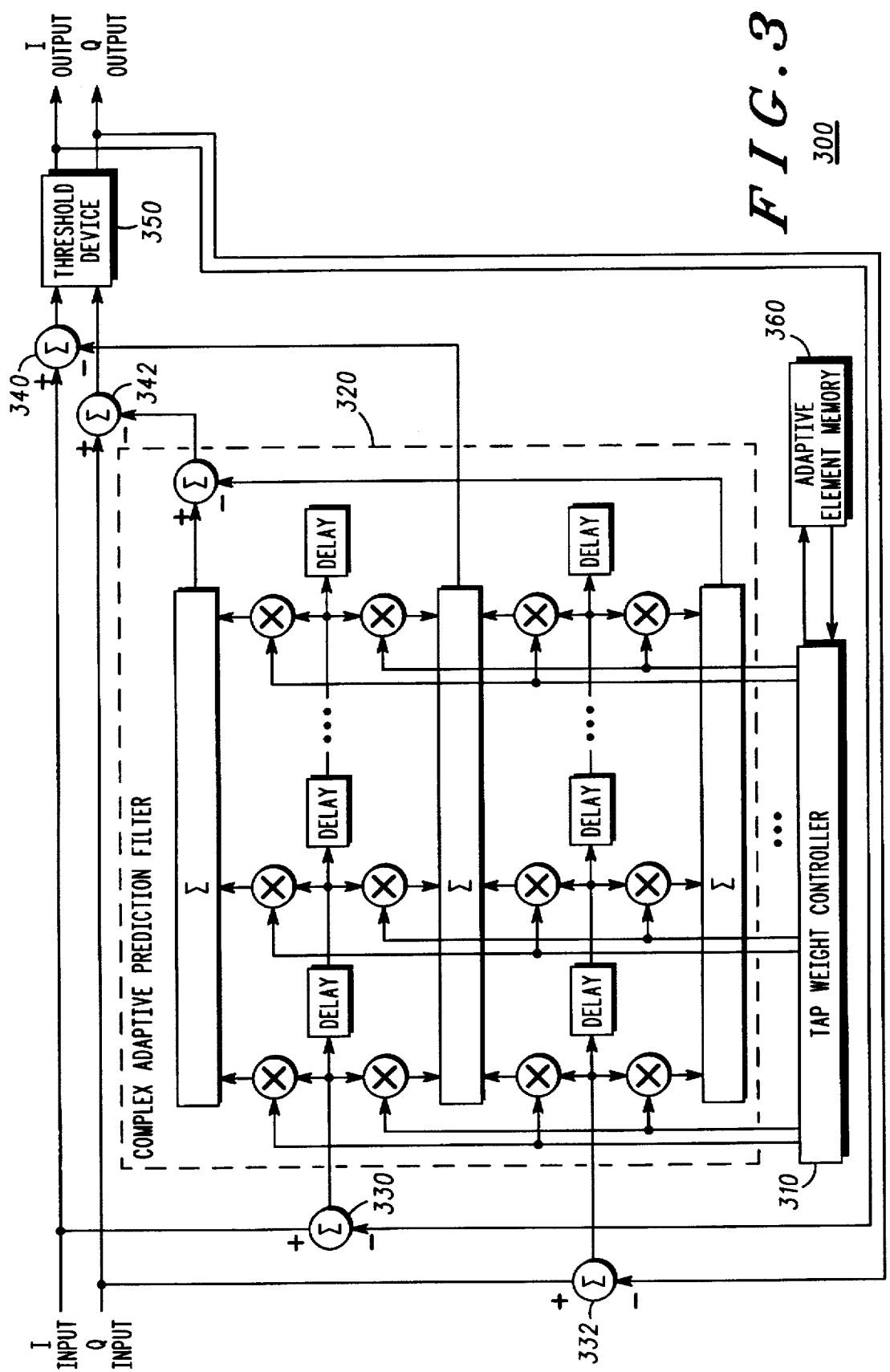

700

DEVICE AND METHOD FOR ADAPTIVE NARROW BAND INTERFERENCE SUPPRESSION IN MULTIPLE-ACCESS COMMUNICATIONS

FIELD OF THE INVENTION

The present invention relates generally to adaptive interference suppression in a communications system, and more particularly to interference suppression in a multi-access communications system.

BACKGROUND OF THE INVENTION

In multiple-access communication systems such as the bi-directional Hybrid Fiber Coax (HFC) cable system, multiple users communicate with a single central site or head-end. In such systems, the headend typically receives bursts of transmissions from the users, and these transmissions are coordinated by the headend according to a Media Access Control (MAC) protocol, which prevents collisions and provides fair and equitable access to the upstream communication link from the users to the headend.

Typically, the burst signal received at the headend is distorted because of the imperfections of the transmission medium. The headend receiver therefore often includes an equalizer which compensates for the channel distortion. In HFC systems, the channel distortion is mainly due to micro-reflections in the coaxial cable. Since bursts from different users travel over different physical paths, the channel distortion can be different for each user. Therefore, the headend receiver needs to set-up a new equalizer for each burst received, or remember the equalizer for each user from burst to burst.

In HFC cable systems, the dominant channel impairment is known as the ingress noise. Ingress noise is typically caused by short-wave or amateur radio transmissions which leak into the cable at various points of poor isolation. Often such ingress noise tends to be narrowband relative to the transmission band of the received signal. Narrowband interference suppression schemes may be used to completely eliminate or at least reduce the effects of such narrowband interference.

Some equalizers which are used to compensate for channel distortion can also help suppress interference due to ingress noise. However, such systems are usually not very effective, because they cannot track rapid variations in the interference very well and at the same time provide good equalization, or they may add substantial overhead for the receiver to learn the interference characteristics at the start of each burst.

BRIEF DESCRIPTION OF THE DRAWINGS

FIG. 3 is a diagram of one implementation of the device for interference suppression of FIG. 2 shown with greater particularity.

DETAILED DESCRIPTION OF THE DRAWINGS

In the present invention, a device for interference suppression is described that takes advantage of the fact that the total interference received by the headend is essentially independent of user transmissions. The device for interference suppression of the present invention includes adaptive elements which are updated in a manner that is independent of who is transmitting. It is also possible to update the adaptive elements of the interference suppresser in the absence of any transmitted signal. The invention allows the headend receiver to track rapid variations in the interference, and simplifies the implementation because there is no need for maintaining multiple sets of adaptive elements, one for each user.

In one embodiment of the invention, the device for interference suppression may be augmented with an equalizer which compensates for the channel distortion. The clear separation of the device for interference suppression from the equalizer allows the head-end receiver to update the adaptive elements of the device during each burst with no interruptions. This allows tracking of rapid variations in the interference, while updating the adaptive parameters of the equalizer on a user-by-user basis, where selected, by maintaining multiple sets of adaptive equalizers, one for each user. In some applications, the equalizer may be fixed (non-adaptive) or, alternatively, may be newly set-up in each burst using a preamble.

Although the invention described herein is primarily utilized for an HFC cable system, it may also be applied to other types of systems, such as wireless communication systems.

Figure 1:
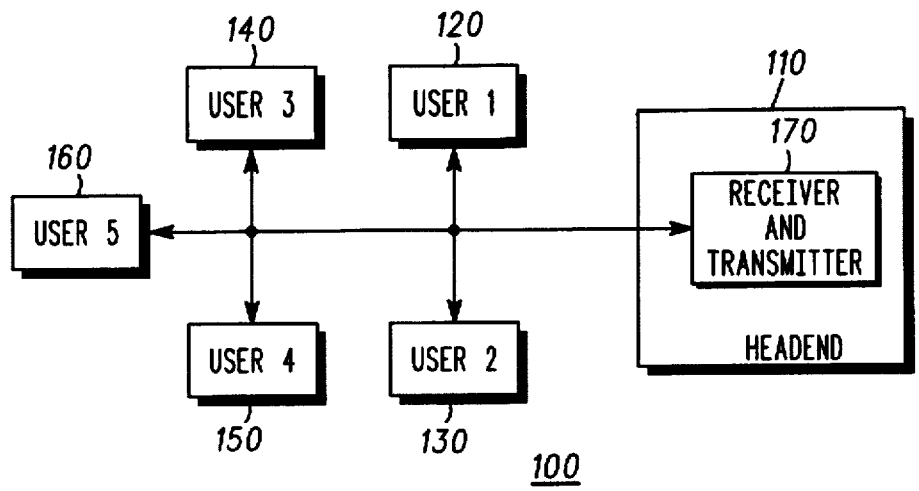
FIG. 1 is a block diagram of a burst multi-access communication system in which the present invention may be utilized.

FIG. 1, numeral 100, shows a multiple-access communications system in which several remote users, (120), (130), (140), (150) and (160) are communicating via a shared medium with a headend, (110), having a receiver and transmitter (170). In particular, the shared medium can be an HFC cable plant. In a bi-directional HFC cable plant, the headend broadcasts to multiple users via a downstream link, while users transmit towards the headend via the upstream link. The upstream link is typically of poor quality due to suffering from many impairments, in particular, the ingress noise, which may be of significant magnitude relative to the user transmitted signal due to the noise funneling effect. The device for interference suppression of the present invention may be used in a headend receiver which is receiving upstream burst transmissions from the users in the form of modulated digital data signals.

Figure 2:
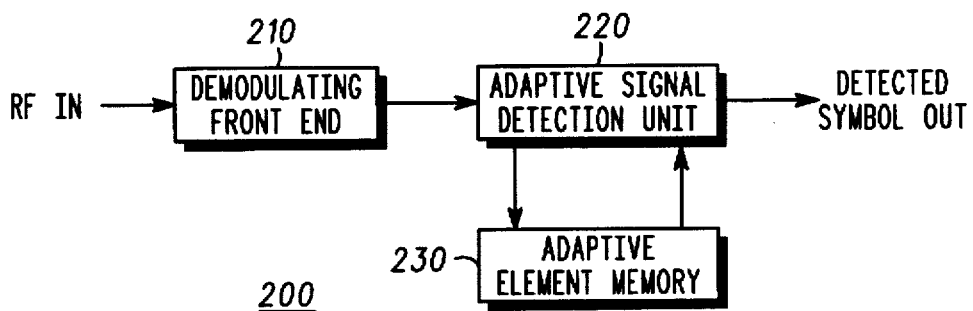
FIG. 2 is a block diagram of a headend receiver incorporating a device for interference suppression in accordance with the present invention.

FIG. 2, numeral 200, shows one embodiment of the device for interference suppression of the present invention. The device includes a demodulating front end (210), an adaptive signal detection unit (220), and an adaptive element memory (230). The demodulating front end (210) is used for converting a radio frequency (RF) signal into baseband and sampling the baseband signal at a predetermined sampling instant and at a rate that is typically an integer multiple of the symbol rate, thus providing a demodulated signal. Generally, the demodulating front end (210) also performs filtering operations to approximate a matched filter. The detailed processing of the demodulating front end is well known in the art and will not be further described here.

The adaptive signal detection unit (220) processes the demodulated signal from the demodulating front end (210) and generates decisions on the transmitted symbols. The adaptive signal detection unit uses an adaptive element memory (230) to store the adaptive elements. The adaptive elements are updated by the adaptive signal detection unit during the reception of a burst or between two bursts and are stored in the adaptive element memory. The adaptive elements are updated by the adaptive signal detection unit to match the interference characteristics. This matching allows the adaptive signal detection unit (220) to suppress the interference and make reliable decisions even in the presence of very strong interference. A key aspect of the invention is that the adaptive elements may be updated continually, regardless of who is transmitting. They may also be updated between bursts. The adaptive signal detection unit (220) receives the adaptive elements from the adaptive element memory, uses the adaptive elements to suppress the interference, updates the adaptive elements to better match the interference characteristics and then stores the updated adaptive elements in the adaptive element memory. The adaptive elements stored at the end of a burst, or at the end of a quiet period between bursts, are used in the beginning of the next received burst.

The device for interference suppression may be implemented by one of: an application specific integrated circuit, a field programmable gate array; a microprocessor, and a software program for implementing the method of the present invention, where the software program is embodied in memory.

FIG. 3, numeral 300, illustrates one implementation of the device for interference suppression in accordance with the present invention for QAM modulation. This type of device for interference suppression is designated below as a decision feedback interference suppresser (DFIS). The demodulating front end is omitted from the figure, since the details of demodulating front ends are well known in the art.

The inputs to the DFIS are the I (in-phase) and Q (quadrature) components from the demodulating front end, both sampled at the symbol rate. The input signal is the sum of the transmitted symbol, the total interference and a background noise component, i.e., $$R(n)=X(n)+I(n)+W(n) \tag{1}$$

where R(n) represents the nth sample of the I(n) and Q(n) input signal, X(n) is the transmitted symbol, I(n) and W(n) are the samples of the interference and background noise components respectively, all represented as complex variables.

In equation (1), it is assumed that there is no intersymbol interference. This is a valid assumption for the HFC plant where channel distortion is typically mild. For cases where channel distortion is not negligible, a plant equalizer can be used together with the device for interference suppression. This will be discussed later with reference to FIG. 6.

In the DFIS, the local I and Q decisions of the current symbol are subtracted from the I and Q inputs at (330) and (332) respectively. When the interference is much stronger in magnitude than the background noise component (a valid assumption for the HFC plant), the difference signal (R(n) −X'(n)), where X'(n) represents the decision on the symbol X(n), becomes an estimate of the current (complex) interference sample. The estimates of the interference samples are then filtered by a complex adaptive prediction filter (320) to produce a prediction, I'(n), of the noise sample for the next demodulator output, $$I'(n)=[\text{sum from } k=1 \text{ to } N](R(n-k)-X(n-k))*F(k) \tag{2}$$

where, F(k), k=1, . . . N, are the complex tap weights of the prediction filter, and * represents a multiplication operation.

Due to the narrowband nature of the interference, fairly accurate prediction is possible, i.e., I'(n)=I(n) approximately. Thus the interference sample in the next input sample is substantially removed by subtracting the complex prediction from the I and Q inputs at (340) and (342). The resulting interference-free samples are then used by the threshold device (350) to detect the transmitted symbol.

Figure 4:
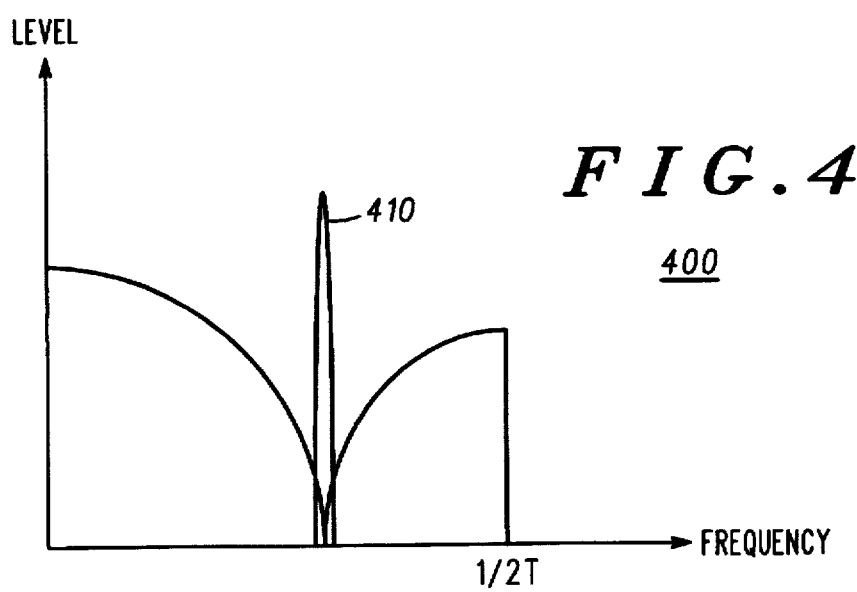
FIG. 4 is a schematic representation of the interference spectrum along with the frequency response of noise filtering for the device for interference suppression of FIG. 3.

The prediction filter removes the interference at the expense of enhancing the background noise component by effectively placing notches at the frequencies where the narrowband interferences (410) are located; see FIG. 4 (400). The amount of noise enhancement is roughly proportional to the width of the notches. As an example, for a single-tap prediction filter, the prediction tap is of magnitude 1 in the presence of a single tonal interferer that is significantly stronger than the background noise component, implying a 3 dB noise enhancement. As the number of taps in the prediction filter is increased, the notch becomes narrower, and the noise enhancement will be reduced. In the limit of an infinite number of taps, the prediction filter achieves perfect cancellation of pure tonal interference with no noise enhancement.

In practice, one potential problem in implementing DFIS is error propagation: when a decision error is made, the error will be fed back to corrupt subsequent decision samples, increasing the probability of error.

The adaptive elements in the interference suppresser are the tap weights, F(k), of the prediction filter, which are adapted to match the interference characteristics of the input signal. The tap weights are adapted in the tap weight controller (310) which is connected to the adaptive element memory (360). The adaptive elements are typically updated using a well-known algorithm such as, for example, the Least Mean-Square (LMS) algorithm. In the LMS algorithm, the error E(n) in the input to the decision device is computed. E(n) may be computed in one of two ways:

1) Reference Mode: If the transmitted symbols, X(n), are known to the headend, E(n) may be computed as, $$E(n)=R(n)-I'(n)-X(n) \tag{3}$$

The reference mode may be used during the period when no one is transmitting, in which case, X(n)=0. If the bursts contain a preamble known to the headend, the reference mode may also be used when receiving the preamble.

2) Decision-directed Mode: The decision-directed mode may be used during the data reception period. In the decision-directed mode, X(n) in equation (3) is replaced with the local decisions X'(n) at the output of the decision device. The local decisions are substantially correct during normal operation.

The LMS algorithm updates each tap weight, F(k), according to the following equation, $$Fn(k)=Fn-1(k)+d*E(n)*\text{conj}(R(n-k)) \tag{4}$$

where, Fn(k) are the tap weights at the nth step, d is the step size that is chosen to trade off convergence speed against residual error, and conj( ) indicates the complex conjugate of its argument. After updating the taps, the weight controller stores the tap weights in the adaptive element memory.

A key aspect of the invention is that the adaptation may be carried out from burst-to-burst, by taking advantage of the fact that the interference characteristics are user independent. In addition, if the demodulating front end produces samples continuously, the adaptation may also be performed between bursts, i.e., when no one is transmitting.

Figure 5:
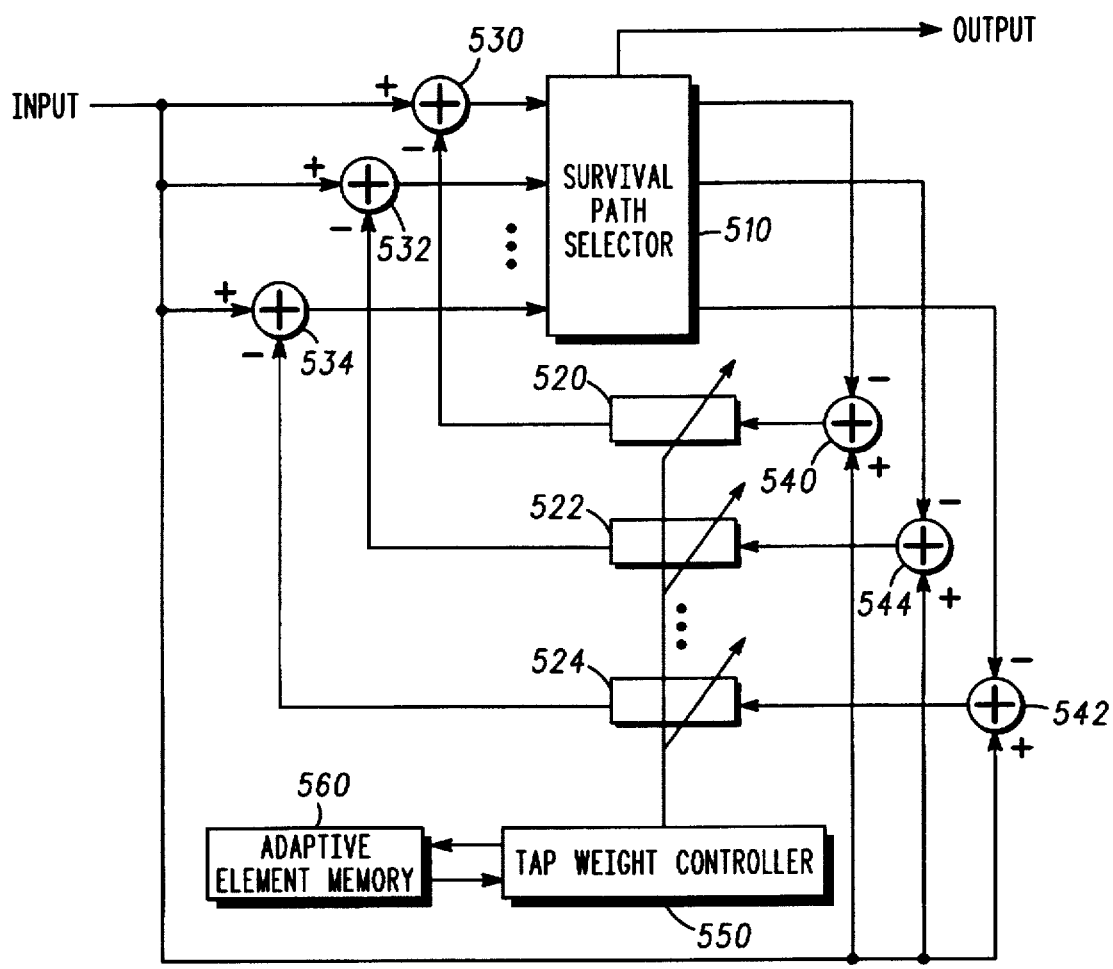
FIG. 5 is a block diagram of another implementation of the device for interference suppression in accordance with the present invention.

FIG. 5, numeral 500, shows an alternative implementation of the device for interference suppression of the present invention. This structure is referred to as a Maximum Likelihood Interference Suppresser (MLIS). In contrast to DFIS, the MLIS determines the entire sequence of transmitted symbols by looking at the entire history of received samples at the output of the demodulating front-end. Again the demodulating front end is omitted from the figure, since the details of a demodulating front end are well known in the art.

One way of implementing the MLIS is by using the Viterbi algorithm. FIG. 5 shows the details of the Viterbi algorithm to emphasize the connection between MLIS and DFIS.

As is well known in the art, the decision of a Viterbi algorithm is based on a state-transition diagram or trellis. In contrast to DFIS, which makes decisions on a symbol-by-symbol basis, the Viterbi algorithm incorporates a survivor path selector (510) which keeps track of all likely sequences of history symbols as survivor paths in the trellis. Upon receiving each symbol-rate sample, the Viterbi algorithm computes metrics for each survivor path and for all possible state transitions corresponding to the transmitted symbol X(n). The metrics are computed as the squared absolute value of, $$R(n)-X(n)-[\text{sum from } k=1 \text{ to } N](R(n-k)-X(n-k))*F(k) \quad (5)$$

where, the tap weight F(k) are the same tap weights used in the DFIS and are matched to the noise characteristics.

Equation (5) is realized by the subtractors (530, 532, ..., 534; 540, 542, ..., 544) and filters (520, 522, ..., 524). The metrics are used by the survivor path selector (510) to update the list of survivor paths by keeping one transition leading to each new state that has the smallest metric. The output produced by the survivor path selector (510) is the final decision for the transmitted symbols. The final decision for a symbol is made when all the survival paths merge for the symbol or by tracing back the path with the least metric.

There is a clear resemblance between the MLIS of FIG. 5 and the DFIS of FIG. 3. In fact, each metric computation for a state transition is essentially the same prediction filtering and interference removal operation in the DFIS. The main difference is that the Viterbi detector keeps track of multiple possible sequences of earlier symbols and defers the decision until a later time, thereby obtaining more reliable decisions. The trade-off in the present invention is the implementation complexity: the Viterbi algorithm requires the computation of multiple metrics, each equivalent to a DFIS of the same length.

However, it is clear that if the memory length of the Viterbi algorithm is at least as long as the number of tonal interferers, the MLIS can achieve near optimum performance for typical interference characteristics. This memory length is typically much shorter than what would be needed for a DFIS to achieve similar performance. The shorter memory length is particularly desirable in the burst transmission environment of HFC, where not many history samples may be available at the beginning of each burst for the detector to use. Another benefit of MLIS is that it does not suffer from the error propagation problem since it keeps track of all likely possibilities of history symbols.

It is noted that the Viterbi algorithm in MLIS may be implemented in other ways than that of FIG. 5, e.g., the input may be prefiltered by a filter with tap weights, {1, -F(1), -F(2), ... -F(N)}. The metric computation becomes the squared absolute value of, $$Y(n)-X(n)-[\text{sum from } k=1 \text{ to } N]X(n-k)*F(k)\text{tm} \quad (6)$$

where, Y(n) is the output of the prefilter. This is equivalent to that of FIG. 5, but may be more computationally efficient when the number of trellis branches is large.

For channels that suffer from multiple interferers, a straightforward implementation of MLIS may introduce an unacceptable level of complexity for the detector, since complexity of MLIS grows exponentially with the number of interferers. Several schemes exist that can significantly reduce the complexity of MLIS without sacrificing much performance.

One such scheme was introduced in the following paper by Vedat Eyuboglu and Shahid Qureshi, "Reduced-State Sequence Estimation (RSSE) with Set Partitioning and Decision Feedback", IEEE Transactions on Communications Vol. 36, No. 1, January 1988. The technique is described in U.S. Pat. No. 4,631,736, Coded Modulation System with Feedback, by Shahid U. H. Qureshi and Vedat Eyuboglu.

RSSE reduces the number of states in the Viterbi decoder by the following two methods: 1) Partition the signal constellation into subsets (Symbols belonging to the same subset are combined into the same state.); and 2) The partition for each history symbol can vary from symbol to symbol; new symbols may have finer partition. As a special case, symbols of history longer than a predetermined number (which may be much less than the memory length of the full state MLIS) are no longer partitioned, i.e., the partition contains only a single subset.

If the partitions are carefully chosen, this technique could result in a trellis of significantly reduced number of states, at the expense of almost negligible performance penalty.

The adaptive elements of the MLIS-type detector are the metric filter tap weights. These tap weights are controlled by the tap-weight controller (550) which is again connected to the adaptive element memory (560). The tap weight controller monitors the input signal to estimate the interference characteristics and adjusts the aforementioned set of tap weights to match the interference characteristics. Many estimation techniques are known in the art. As an example, one may use an LMS algorithm. Again, the adaptation may be carried out from burst to burst, or even between bursts.

Figure 6:
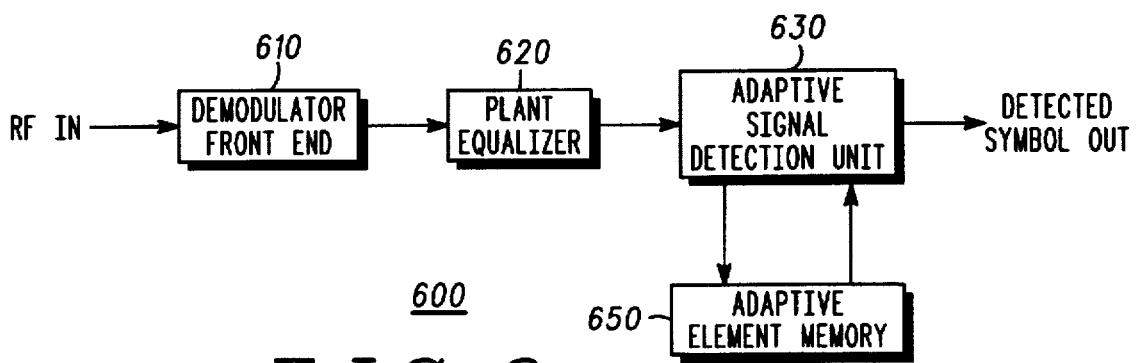
FIG. 6 is a block diagram of a headend receiver incorporating the device for interference suppression augmented with a plant equalizer in accordance with the present invention.

FIG. 6, numeral 600, shows one embodiment of the device for interference suppression of the present invention augmented with a plant equalizer (620). The plant equalizer is coupled to the demodulating front end (610) and provides an equalized demodulated signal to the adaptive signal detection unit (630) and to the adaptive element memory (650) in response to the demodulated signal from the demodulating front end.

The purpose of the plant equalizer (620) is to compensate for the channel distortion while the device for interference suppression is responsible for combating narrow band interference. The plant equalizer includes adaptive elements in order to track variations in the plant response and the interference characteristics, respectively. The separation of functions allows one to apply different update mechanisms to the equalizer and the interference suppresser. Specifically, the device for interference suppression may be adapted from burst to burst regardless of which user is transmitting and may also be adapted between bursts when no one is transmitting. The plant equalizer, on the other hand, where adaptive, may be adapted individually for each burst depending on the particular user transmitting the burst.

The function separation is very desirable in systems such as the HFC cable network, because the channel distortion is relatively mild and tends to be slowly varying, while the interference characteristics may vary rapidly and may require a larger number of adaptive elements. These characteristics imply that the plant equalizer may be relatively simple and may then be updated slowly, while the noise suppresser needs more adaptive elements, but requires rapid training.

Figure 7:
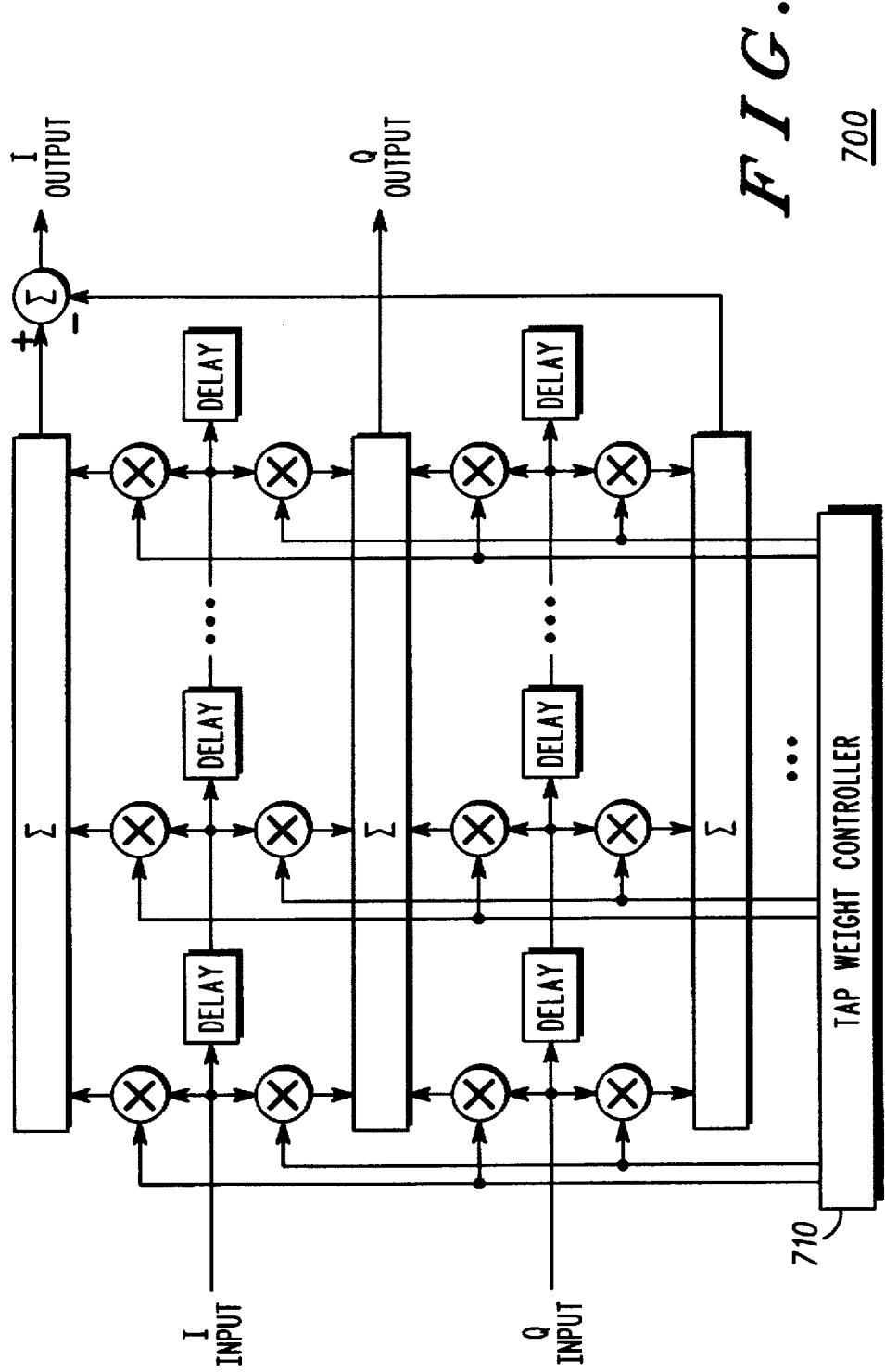
FIG. 7 is a block diagram of one implementation of the plant equalizer of FIG. 6 shown with greater particularity.

FIG. 7, numeral 700, is a block diagram illustrating an implementation of the device for interference suppression of the present invention together with a plant equalizer for a QAM modulation. A linear transversal type equalizer is shown in FIG. 7, although it is clear that another type of filter may also be used with the invention. The plant equalizer typically operates at either the symbol rate or an integer multiple of the symbol rate at the plant equalizer input and at the symbol rate at the plant equalizer output.

The tap weights of the equalizer are the adaptive elements of the equalizer and are controlled by the tap weight controller (710). For the HFC plant, since the channel distortion is typically very mild, the use of an adaptive equalizer may be eliminated. In this case, a constant set of tap weights is used. If the equalizer has only a single tap, then the headend receiver degenerates to the case shown earlier with no plant equalizer at all.

The adaptive elements of an equalizer may be updated in one of several ways:

1) Burst-by-Burst adaptation: This may be done using one of the well-known adaptation algorithms such as the LMS or RLS algorithms. These algorithms require the use of reference symbols, which is typically achieved by including a preamble at the beginning of each burst. The preamble is a special pattern of symbols that is known at the headend. Under this scheme, the tap weights are reset at the beginning of each burst and are trained using the preamble as the reference. The local decisions can be used as reference to continue training the equalizer during data reception.

2) Burst-by-Burst Adaptation with Memory: Under this scheme, the headend stores the equalizer tap weights at the end of each burst. Multiple sets of tap weights are maintained, one for each user. In contrast to the previous scheme, at the beginning of each burst, the tap weights are restored based on information about who is transmitting. The burst-by burst scheme does not require a preamble for training the equalizer. However, the headend receiver needs to know which user is currently transmitting. Identification of the current user may be obtained by including a physical source address at the beginning of each burst which can be transmitted at a low rate such that the headend is able to reliably detect the address before the channel is equalized.

3) Transmitter Adaptation: Here, the plant equalizer is implemented at the transmitter. During each user's initial registration, the headend measures the channel distortion, and computes the equalizer taps which are then sent back to the user via the downstream channel. The user then configures the equalizer with the taps received. During subsequent bursts from this users, the headend monitors the channel distortion and sends back the control messages for adjusting the equalizer taps, when necessary.

In 1) and 2) where the plant equalizer is implemented in the headend receiver, the plant equalizer introduces spectrum shaping to the background noise and the noise shaping is user dependent. Since the adaptation algorithm in the device for interference suppression typically attempts to compensate for the noise shaping, the resulting adaptive elements may not be optimal for all users. However, in applications such as transmission over the HFC plant, channel distortion and thus noise shaping is typically mild. In addition, the ingress noise is typically much stronger than the background noise. Therefore, the adaptive elements of the device for interference suppression are adequate for ingress suppression even with varying background noise shaping.

We claim:

1. A device for providing interference suppression for receiving a burst transmission of a modulated digital data signal from one of a plurality of users in the presence of interference in a multiple-access communication system, comprising:

A) a demodulating front end for demodulating the received burst transmission to provide a demodulated signal;

B) an adaptive signal detection unit, coupled to receive the demodulated signal and coupled to an adaptive element memory, for processing the demodulated signal utilizing the adaptive elements received from the adaptive element memory, and for updating said adaptive elements using a predetermined adaptation algorithm based on the demodulated signal for suppressing interference; and C) the adaptive element memory, coupled to the adaptive signal detection unit, for receiving updated adaptive elements from the adaptive signal detection unit and storing them, wherein adaptive elements received by the adaptive element memory prior to the reception of a next burst transmission are utilized by the adaptive signal detection unit to process the next burst transmission wherein the next burst transmission is received from any one of the plurality of users.

2. The device of claim 1 wherein the device is one of:

A) an application-specific integrated circuit;

B) field programmable gate array; and

C) a microprocessor.

3. The device of claim 1 where the multiple-access communication system is operated over a Hybrid Fiber-Coax (HFC) system.

4. The device of claim 1 wherein the adaptive signal detection unit is one of:

A) a decision feedback interference suppresser; and

B) a maximum-likelihood interference suppresser.

5. The device of claim 4 wherein the decision feedback interference suppresser includes:

A) a first subtractor, for receiving and subtracting from the demodulated signal a predicted interference sample provided by a prediction filter;

B) a threshold device, coupled to the first subtractor, for detecting a transmitted symbol in the burst transmission;

C) a second subtractor, coupled to receive the demodulated signal and to the threshold device, for subtracting the transmitted symbol from the demodulated signal; and D) a prediction filter based on a set of adaptive estimates of interference characteristics, coupled to the second subtractor, for providing the predicted interference sample to the first subtractor.

6. The device of claim 4 wherein the maximum likelihood interference suppresser is implemented using a Viterbi algorithm based on a set of adaptive estimates of the interference characteristics.

7. The device of claim 1 wherein the adaptive elements comprise a set of adaptive estimates of interference characteristics that is adapted during burst transmissions.

8. The device of claim 1 wherein the adaptive elements comprise a set of adaptive estimates of interference characteristics that is adapted between successive burst transmissions.

9. The device of claim 4 wherein the maximum likelihood interference suppresser uses a reduced-state sequence estimator.

10. The device of claim 1 further including a plant equalizer, coupled to the demodulating front end between the demodulating front end and the adaptive signal detection unit, for providing an equalized demodulated signal to the adaptive signal detection unit in response to the demodulated signal from the demodulating front end.

11. The device of claim 10 wherein the plant equalizer comprises an adaptive filter.

12. The device of claim 11 wherein the adaptive filter is a finite impulse response filter having a plurality of taps wherein the tap weights are adjusted for each burst in accordance with a preamble in the burst.

13. The device of claim 11 wherein the adaptive filter is a finite impulse response filter having a plurality of taps, wherein tap weights are set with a prestored set of coefficients that belong to the transmitting user.

14. A method for providing interference suppression for receiving a burst transmission of a modulated digital data signal from one of a plurality of users in the presence of interference in a multiple-access communication system, comprising:

A) demodulating, by a demodulating front end, the received burst transmission to provide a demodulated signal.

B) adaptive processing, using an adaptive signal detection unit having adaptive elements, coupled to receive the demodulated signal and coupled to an adaptive element memory, for processing the demodulated signal utilizing the adaptive elements received from the adaptive element memory, and for updating said adaptive elements using a predetermined adaptation algorithm based on the demodulated signal for suppressing interference; and C) storing, by the adaptive element memory, of the adaptive elements received from the adaptive signal detection unit, wherein said adaptive elements computed prior to receiving the burst transmission are used by the adaptive signal detection unit to process the next burst transmission wherein the next burst transmission is received from any one of the plurality of users.

15. The method of claim 14 wherein the method is implemented by one of:

A) an application specific integrated circuit;

B) field programmable gate array;

C) a microprocessor; and

D) a computer program embodied in a memory.

16. The method of claim 14 wherein the adaptive processing is implemented by one of:

A) a decision feedback interference suppresser; and

B) a maximum likelihood interference suppresser.

17. The method of claim 16 wherein the steps implemented by the decision feedback interference suppresser include:

A) receiving and subtracting, by a first subtractor, from the demodulated signal a predicted interference sample provided by a prediction filter;

B) estimating, by a threshold device, a transmitted symbol in the burst transmission;

C) subtracting, by a second subtractor the transmitted symbol from the demodulated signal; and D) filtering, by a prediction filter, for providing the predicted interference sample to the first subtractor based on a set of adaptive estimates of the interference characteristics.

18. The method of claim 16 wherein the maximum likelihood interference suppresser uses a Viterbi algorithm based on a set of adaptive estimates of the interference characteristics.

19. The method of claim 14 wherein updating the adaptive elements includes updating a set of adaptive estimates of interference characteristics during burst transmissions.

20. The method of claim 14 wherein updating the adaptive elements includes updating a set of adaptive estimates of interference characteristics between successive burst transmissions.

21. The method of claim 16 wherein the maximum likelihood interference suppresser uses a reduced-state sequence estimator.

22. The method of claim 14 further including coupling a plant equalizer to the demodulating front end between the demodulating front end and the adaptive signal detection unit, wherein the plant equalizer provides an equalized demodulated signal to the adaptive signal detection unit and to the adaptive element memory in response to the demodulated signal from the demodulating front end.

23. The method of claim 22 wherein the plant equalizer is an adaptive filter.

24. The method of claim 23 wherein the adaptive filter is a finite impulse response filter having a plurality of taps, wherein the tap weights are adjusted for each burst in accordance with a preamble in the burst.

25. The method of claim 23 wherein the adaptive filter is a finite impulse response filter having a plurality of taps, wherein tap weights are set with a prestored set of coefficients that belong to the transmitting user.

* * * * *